(No Model.)
F. M. McCARTY.
DENTAL ENGINE MALLET.
No. 515,126. Patented Feb. 20, 1894.
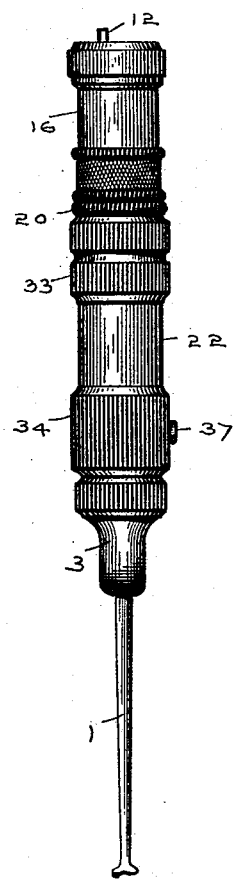
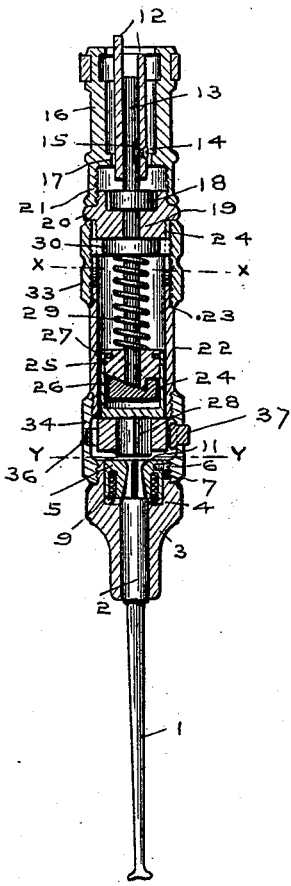
Witnesses
H. D. Nealy
N. D. Tilford
Inventor
Frank M. McCarty,
By Attorney
V. H. Lockwood
THE NATIONAL LITHOGRAPHING COMPANY,
WASHINGTON, D. C.

UNITED STATES PATENT OFFICE.

FRANK M. McCARTY, OF SHELBYVILLE, INDIANA.

DENTAL-ENGINE MALLET.

SPECIFICATION forming part of Letters Patent No. 515,126, dated February 20, 1894.

Application filed April 1, 1893. Serial No. 468,644. (No model.)

*To all whom it may concern:*

Be it known that I, FRANK M. McCARTY, of Shelbyville, county of Shelby, and State of Indiana, have invented certain new and useful Improvements in Dental-Engine Mallets; and I do hereby declare that the following is a full, clear, and exact description thereof, reference being had to the accompanying drawings, in which like figures refer to like parts.

My invention relates to a dental engine mallet and especially to the means of throwing it in and out of gear, the means of holding the plugger point and its socket hub so that they may be readily inserted or removed from the stock, and other features which will hereinafter appear.

Figure 1 is a plan view of my dental engine mallet, being about one and one half times the proper size of the same. Fig. 2 is a longitudinal section of the same. Fig. 3 is a cross section of the same at $x$—$x$—, Fig. 2. Fig. 4 is a cross section of the same at $y$—$y$, Fig. 2. Fig. 5 is a plan view of the portion of the device containing the spring which impels the mallet, the threaded band around the same being removed. Fig. 6 is a perspective view of the collar or plunger in which the socket hub is secured.

1 is a plugger point which is screwed into a socket in the socket hub 2. The socket hub 2 fits in an opening in the stock 3, the outer end of the socket hub being flush with the outer end of the stock. The inner end of the stock 3 is provided with a circular cavity at 4 in which fits a circular collar or plunger 5. This collar or plunger is prevented from rotating by screws 6 passing through longitudinal slots in the inner shell of the stock 3. In the outer end of the collar or plunger 5 are longitudinal holes 8 containing coil springs 9 which bear against the stock 3 and tend to push the collar or plunger 5 backward as far as the slots 7 will permit the screws 6 to move. In this collar or plunger 5 is centrally located an aperture at 10 whose wall is so beveled that the diameter of the aperture is less between the two faces of the plunger 5 than it is at the faces, but the diameter of the aperture at its outer end is slightly greater than its diameter at the inner end.

11 are prongs being extensions of the socket hub 2 and which are parallel and have a space between them enabling them to be sprung toward each other. The outer surface of these prongs 11 is made to conform to that of the wall of the aperture 10, that is there is a slight enlargement at each end of such prongs, which, after the socket hub is inserted in the plunger 5, spring out and fill the enlarged portion of the aperture 10 and retain such socket hub in place. It is readily seen that with this construction the socket hub can be easily inserted or withdrawn from the plunger 5.

12 is a tube made in the ordinary way for the attachment of a dental engine. It is secured to the shaft 13 by a set screw 14 which extends into a longitudinal slot at 15 in the shaft 13, whereby the tube 12 can be slightly set backward or forward. The tube 12 operates in a section 16 of the casing which has a wall 17 fitting snugly around the tube 12 and in which such tube has a bearing.

18 is a collar rigidly secured to the shaft 13 which fits in a circular opening in the connecting joint 19 of the casing.

Extending centrally around the part 19 is a milled extension 20 for the purpose of unscrewing it and on each side of such milled extension the joint 19 is threaded for the attachment on one hand of the section 16 of the casing by means of a threaded circular flange or extension 21, and on the other hand of the section 22 which has a thinner extension at 23 whose outer end is internally threaded whereby it can be joined to the joint 19.

On the inner end of the shaft 13 is rigidly secured the cam faced clutch 24 having two inclined faces. A twin cam faced clutch 25 is loosely mounted on the shaft 13 facing the clutch 24 and is rigidly secured within the sleeve 26 by means of screws 27. The sleeve 26 is a rearward extension of the mallet 28.

29 is a coiled spring surrounding the shaft 13 and extending from the rear face of the cam clutch 25 to the collar 30 which is loosely mounted on the shaft 13. This collar 30 has two extensions 31 extending in opposite directions through a slot at 32 in the shell like extension of the section 22 of the casing as seen in Fig. 5. These extensions 31 of the collar 30 are provided with transverse threads adapted to mesh with the internal threads of the band 33, which surrounds the shell-like extension of the section 22 of the casing, between the off-set at 23 and the annular extension 20 of the joint 19. The purpose of this band 33 is to enable the operator, by turning it, to move the collar 30 forward or backward and readily increase or decrease the tension of the spring 29, and therefore the intensity of the blow of the mallet. The relative position of the band 33, the collar 30 with its extensions 31 and the shell-like extension of the section 22 will be readily understood by referring to Fig. 3. The section 22 and the stock 3 are connected by the band 34 which is internally threaded a part of the way at each end, while the parts 22 and 3 are externally threaded to fit with it.

Within the band 34 is a collar 35 provided with a square aperture centrally located through which extends the square mallet 28, so that the mallet contacts with the inner face of the plunger 5 and the prongs 11 of the shank 2. About the inner periphery of the central part of the band 34 is a recess or groove in which fits the annular spring 36.

37 is a friction pin fitting in an opening in the band 34, its inner face normally resting some distance from the outer periphery of the collar 35, being supported in this position by flanges 38 resting upon the cut ends of the annular spring 36, in such manner that the friction pin may be pressed down and, by binding on the collar 35, stop it and the mallet from rotating and when released the ends of the spring 36 will return it to its normal position out of engagement with the collar 35.

The mode of operation of my dental engine mallet is as follows: The shaft of the dental engine is attached to the tube 12 in the usual manner and rotates the shaft 13, thus rotating the cam 24, and since the spring 29 holds the cam 25 normally in engagement with the cam 24, the cam 24 by virtue of the friction between it and the cam 25 rotates the cam 25, and therefore the sleeve 26 and the mallet 28 and the collar 35, while these are left free to rotate. While the mallet is thus rotating, it does not hammer against the plunger 5. When, however, the thumb presses on the friction pin 37 causing it to engage the periphery of the collar 35, the collar stops rotating, likewise the mallet 28, the sleeve 26 and the cam 25. When the cam 25 does not rotate, the face of the cam 24 turns bearing against the face of the cam 25, the two cams interlocking every half revolution. Supposing the cams to be interlocked, the turning of the cam 24 by reason of the inclined faces of the cams, pushes the cam 25 rearward until the toes of the cams escape each other, when the spring 29 will quickly drive the cam 25 forward causing it again to interlock with the cam 24. As the cam 25 is suddenly impelled forward it obviously moves the sleeve 26 and mallet 28 quickly forward, causing the mallet to strike against the plunger 5 and socket hub 2 thus giving the plugger point 1 sharp rapid blows. When it is desired to stop malleting, the thumb is removed from the pin 37 allowing it to spring backward in its normal position out of engagement with the collar 35, whereupon the collar 35 and the cam 25 rotate along with the cam 24. The friction pin 37 is located in the most convenient place to receive pressure from the thumb while the operator is holding the instrument, the slightest pressure causing the mallet to operate and the slightest relaxation stopping its operation. By virtue of the construction of the shank 2 so that its prongs 11 fit in the beveled aperture of the plunger 5, the plugger point with the hub 2 can be instantly removed by merely drawing it out and another one inserted merely by pushing them in. The intensity of the blow of the plugger point is adjusted quickly by turning the band 33 causing the collar 30 to move forward, thus increasing the tension of the spring 29, or to move backward decreasing it. The tube 12 can be longitudinally adjusted by virtue of the set screw 14. By reason of the construction of the casing in sections any portion of the device is quickly accessible, and when the sections are in place the casing is strong and firm.

What I claim as my invention, and desire to secure by Letters Patent, is—

1. In a dental engine mallet wherein the mallet is operated by a cam mechanism, a collar surrounding such mallet and adapted to rotate with the same, and means for engaging such collar and preventing its rotation when desired, substantially as shown and described.

2. In a dental engine mallet wherein the mallet is operated by a cam mechanism, a collar surrounding such mallet and adapted to rotate with such mallet when it rotates, and a spring supported friction pin extending through the casing and adapted when pressed down to engage such collar and stop the rotating of the same and the mallet, substantially as shown and described.

3. In a dental engine mallet wherein the mallet is operated by a cam mechanism, a collar surrounding such mallet and adapted to rotate with it, an annular spring surrounding such collar and fitting in a recess in the casing and having cut ends, a friction pin extending through the casing, and lugs on the inner end of such friction pin adapted to rest upon the cut ends of such spring, in such manner that the springs will hold the friction pin normally out of engagement with such collar and that such friction pin when pressed down will engage and stop such collar from rotating and thus stop the rotation of such mallet, substantially as shown and described.

4. In a dental engine mallet, a rotatable shaft provided with a cam at its inner end, a mallet provided with a sleeve inclosing the cam on such shaft and also a twin cam rigidly secured to such sleeve, a spring adapted to impel such mallet forward, a collar surrounding such mallet adapted to rotate with such mallet, and a spring supported friction pin extending through the casing and adapted when operated to stop such collar and mallet from rotating, substantially as shown and described.

5. In a dental engine mallet, a socket hub provided with spring extensions, and a plunger mounted in the mallet stock and provided with a suitable seat for such spring extensions, whereby the socket hub may be readily connected to or disconnected from the plunger, substantially as shown and described.

6. In a dental engine mallet, a socket hub provided with two parallel prongs having an enlargement on their ends, and a plunger provided with a bevel faced aperture to receive and hold the spring prongs of such hub, substantially as shown and described.

7. In a dental engine mallet, a suitable stock, a socket hub fitting in an aperture in such stock and provided with parallel spring prongs having an enlargement at their inner ends, a spring supported collar or plunger in a recess in the inner end of such stock and provided with a bevel faced aperture adapted to receive and hold the spring prongs of such hub, and means of holding such collar or plunger longitudinally in place, substantially as shown and described.

In witness whereof I have hereunto set my hand this 30th day of March, 1893.

FRANK M. McCARTY.

Witnesses:
V. H. LOCKWOOD,
N. D. TILFORD.